(No Model.) 2 Sheets—Sheet 1.

W. N. PAGE.
HEATING APPARATUS FOR BOILERS.

No. 309,311. Patented Dec. 16, 1884.

WITNESSES
Ed. A. Newman
Al. C. Newman

INVENTOR
Wm. N. Page.

By his Attorneys (No Model.) 2 Sheets—Sheet 2.

W. N. PAGE.
HEATING APPARATUS FOR BOILERS.

No. 309,311. Patented Dec. 16, 1884.

WITNESSES
Ed. A. Newman,
Al. C. Newman,

INVENTOR
Wm. N. Page.
By his Attorneys
Baldwin, Hopkins & Peyton.

UNITED STATES PATENT OFFICE.

WILLIAM N. PAGE, OF GOSHEN BRIDGE, VIRGINIA.

HEATING APPARATUS FOR BOILERS.

SPECIFICATION forming part of Letters Patent No. 309,311, dated December 16, 1884.

Application filed August 2, 1884. (No model.)

*To all whom it may concern:*

Be it known that I, WILLIAM N. PAGE, of Goshen Bridge, Rockbridge county, Virginia, have invented certain new and useful Improvements in Heating Apparatus for Boilers, of which the following is a specification.

My invention relates to improvements in apparatus particularly applicable to locomotive-engines for heating boilers by means of gaseous fuel of the class in which solid fuel is converted into highly-combustible gases which are supplied as needed to furnaces of the boilers to be treated. My objects, mainly, are to produce improved apparatus of this class which shall be so constructed as to provide means for economically generating the combustible gases in needed quantities, means for readily controlling the apparatus, and means for heating the feed-water for the boiler or boilers.

A suitable adaptation of my improvements, hereinafter pointed out by the claims, is shown in the accompanying drawings in connection with those parts of a locomotive and tender and their attachments, illustration of which is sufficient to convey a proper understanding of my invention.

Figure 1:
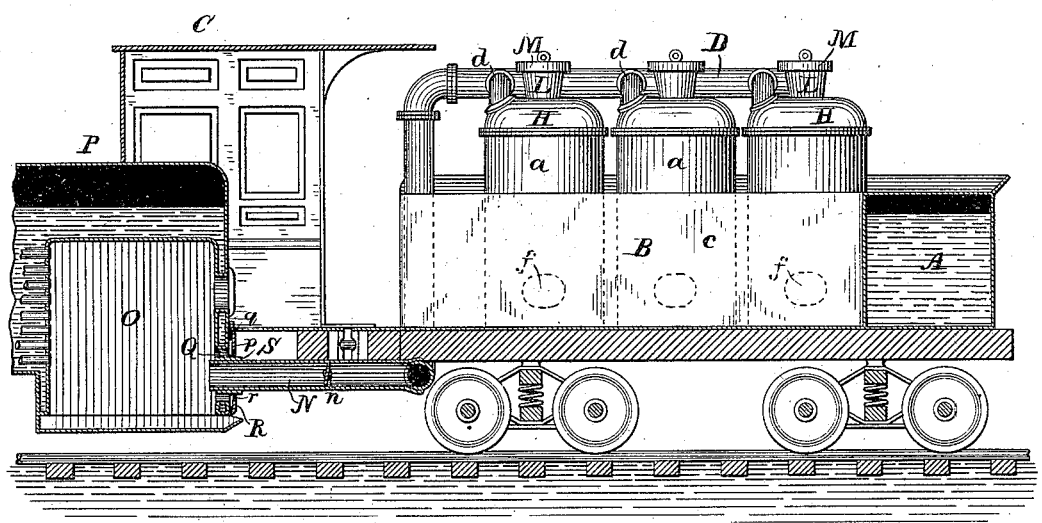
Figure 2:
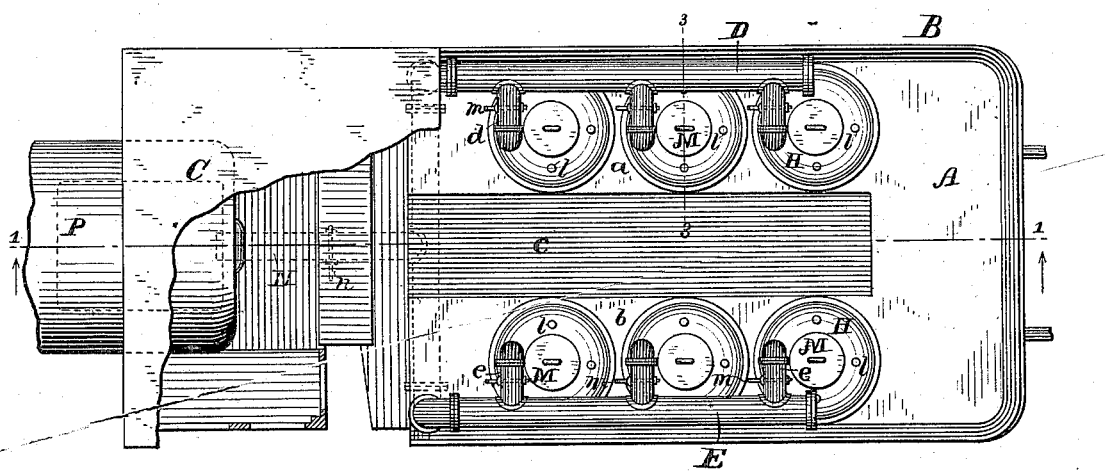
Figure 3:
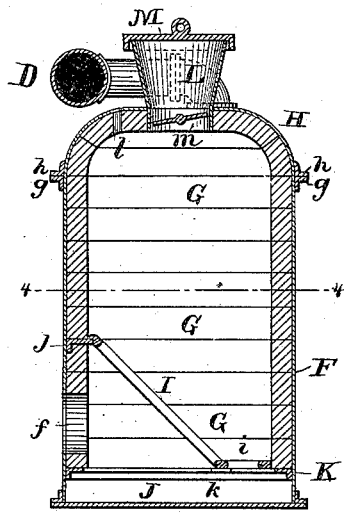
Figure 5:
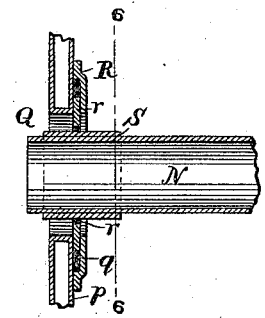
Figure 4:
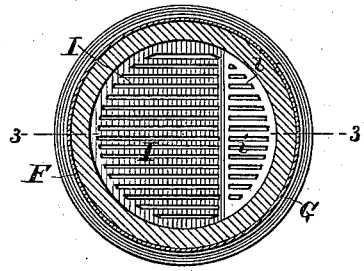
Figure 6:
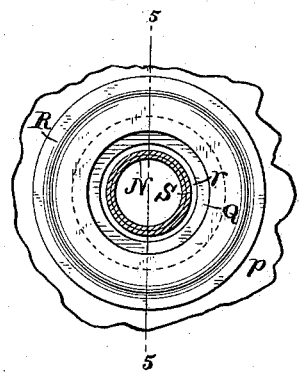

Figure 1 is a view, partly in side elevation and partly in vertical longitudinal section, on the line 1 1 of Fig. 2. Fig. 2 is a plan or top view with parts broken away. Fig. 3 is a vertical section on the line 3 3 of Figs. 2 and 4, showing on an enlarged scale one of the gas-generators or producers; and Fig. 4, a section on the line 4 4 of Fig. 3. Fig. 5 is a view in vertical section on the line 5 5 of Fig. 6; and Fig. 6, a view in elevation, partly in section, on the lines 6 6 of Figs. 1 and 5.

As my improvements are in this instance organized the water-tank A of the tender B of a locomotive-engine, C, is provided with two series of gas-producers, $a$ and $b$. Each series consists of three gas-producers; but the number may be varied as circumstances may require, and the producers of the series $a$ and $b$, respectively, have communication by means of branch pipes $d$ and $e$ with their respective connecting-pipes D and E. The gas-producers $a$ are arranged at one side of the central fuel-compartment, $c$, of the tender and the gas-producers $b$ at the other side. By this arrangement not only are the gas-producers located so that they may be conveniently supplied with fuel from the compartment $c$, but ready access is afforded to their outwardly-facing doors $f$ at the opposite sides of the tender, the doors of the one series of producers being accessible from one side of the tender, and those of the other series from the opposite side, as will readily be understood.

In addition to the outwardly-facing door each gas-producer is constructed as follows: A sectional metallic shell or casing, F, is lined with fire-clay or equivalent refractory material, formed by a number of rings, G. The upper section, H, of the shell F is detachably united with the main portion F of the shell by means of the annular abutting flanges $h$ and $g$ of the respective sections and suitable fastening devices. The lining-rings G may be inserted in place and be removed as desired by detaching the sections. A large grate-surface is provided by means of an annular grate, formed, as shown, with the inclined portion I and horizontal portion $i$. The door $f$ affords access to the space beneath the portion I of the grate. An ash-pan, J, beneath the grate is supplied with water, and the steam ascending from the water in the ash-pit constitutes one of the constituents of the gas generated from the fuel above the grate. The lowermost section or ring, G, of the lining of the shell F is supported upon an internal annular flange, K, of the shell, formed by a ring of metal secured to the shell. The lower or horizontal portion of the grate is also supported by this flange-ring, which is provided with inwardly-projecting lugs $k$, (only one of which is shown,) upon which the grate rests. At top the grate is supported by means of any desired number of lugs $j$, secured to the shell, and projecting inwardly beyond the lining. Holes $l$ in the top of the gas-producer, fitted with detachable plugs, provide for testing the gas and for admitting a rod for stirring the fuel from above. A charging-hopper or fuel-reservoir, L, having a cover, M, at top and a valve, $m$, within its lower end, provides for supplying fuel to the producer, without allowing gas to escape therefrom, the rock-shaft or controlling-rod of the valve being actuated to hold the valve closed when the hopper contains fuel or is being filled, and the cover being placed in position before the valve is operated by the rock-shaft to discharge the fuel from the hopper, as will readily be understood. The branch pipes d e of the gas-producers are provided with valves, in order not only that the amount of gas allowed to pass to the connecting-pipes D E may be regulated or cut off entirely, but that the draft may be controlled at will and increased or lessened in the respective producers as circumstances may require. The connecting-pipes D E are closed at their rear ends and extend downward and inward at their forward ends and communicate with a common conducting-pipe N, by way of which the gases pass to the furnace, in which they are burned. This conducting-pipe is rigid, and is provided with a valve, n, by means of which the volume of gas allowed to pass through it may be regulated, or the passage of the gas cut off entirely when the tender is disconnected from the locomotive. At its forward end the conducting-pipe enters the fire-box O of the boiler furnace, to which air is admitted in a well-known way in quantity needed to insure thorough combustion of the gaseous fuel issuing from the conducting-pipe.

The furnace and the boiler P are of usual construction, and the conducting-pipe passes through the fire-box front p, and is supported thereby in such manner that a universal-joint connection between the pipe and fire-box front is provided in order that all the movements of the coupled locomotive and tender independently of each other may take place without injury to the conducting-pipe.

As shown, the universal-joint supporting connection of the conducting-pipe with the fire-box is as follows: A round opening, Q, of a diameter greater than that of the pipe is formed in the fire-box front, and an annular recess, q, constituting a guideway for a centrally-open disk, r, is formed about this opening by means of the centrally-open plate R, secured to the fire-box. The opening in this guideway-plate R corresponds in size with that in the fire-box, and it is set off from the fire-box a distance sufficient to form the guideway-recess, as plainly shown in Fig. 5. The conducting-pipe is provided with a collar or short sleeve, S, to protect it from wear, and the opening in the disk r is of a diameter somewhat greater than that of this sleeve, in order that the conducting-pipe may be allowed the required freedom of movement in all directions. This loose joint-connection of the pipe with the fire-box wall permits air to enter the fire-box about the pipe, and thus insures the supply of a portion of the air needed to promote combustion at the point at which the gases are discharged into the fire-box.

From the above description it will be seen that gas may be generated from the solid fuel (refuse such as coal-screenings may be employed for fuel) in quantity as needed and supplied to the boiler-furnace; that the waste heat from the producers is utilized in heating the feed-water; that the same tender may be employed with any locomotive provided with the universal-joint attachment; that the attendant or fireman has ready access to all the producers, and may conveniently charge them with fuel from the usual fuel-compartment, and that the producers, while of economical construction, are provided with large grate-surfaces, thus insuring the most thorough and rapid production of gas.

I am aware that it is not new, broadly considered, either to heat the boilers of locomotive or other furnaces by the combustion of gaseous fuel, or to provide the tender of a locomotive with gas-producing apparatus, and to conduct the gas from such apparatus to the locomotive fire-box and there burn it; and I do not unqualifiedly claim either heating boilers by the consumption of gaseous fuel, or the combination, with a locomotive and its tender, of gas-producing apparatus mounted on the tender, and means for conducting the gas to the fire-box of the locomotive, where it is burned. Neither do I wish to be understood as confining my invention to the details of arrangement and construction of parts herein particularly described, as my improvements may be modified in many respects. For instance, any suitable equivalent for the universal joint connecting the gas-conducting pipe with the fire-box may be employed in lieu of the devices shown, and some of the essential and novel features of my invention may be employed without the others and in an organization differing from that shown.

I claim as of my own invention—

1. The combination of the feed-water tank, gas-producing apparatus supported in the tank and serving to heat the feed-water, and means for conducting the gas from the producing apparatus to the fire-box of a boiler-furnace, substantially as hereinbefore set forth.

2. The combination of the tender, the gas-producers arranged on opposite sides of the fuel-compartment of the tender, their branch pipes provided with valves, the connecting-pipes, and the conducting-pipe and its valve, substantially as and for the purpose hereinbefore set forth.

3. The combination of the tender, the two series of gas-producers arranged on opposite sides of the fuel-compartment thereof, and having the outwardly-facing doors, the branch pipes of the gas-producers provided with valves, the connecting-pipes, the conducting-pipe, the fire-box of the locomotive, and the universal-joint supporting connection of the conducting-pipe with the fire-box, substantially as and for the purpose hereinbefore set forth.

4. The combination of the tender, the gas-conducting pipe, the locomotive fire-box provided with the opening in its front for the pipe, the centrally-opened disk through which the pipe loosely projects, and the centrally-open guideway-plate secured to the fire-box front, substantially as and for the purpose hereinbefore set forth.

In testimony whereof I have hereunto subscribed my name.

WM. N. PAGE.

Witnesses:
HEAGUE HOUGHTON,
L. L. WATSON.